US012177194B1

(12) United States Patent
    Kassan

(10) Patent No.: US 12,177,194 B1
(45) Date of Patent: Dec. 24, 2024

(54) MACHINE LEARNING AND QUANTUM COMPUTING RESISTANT SYSTEMS FOR PRIVATE AND SHARED CLOUD DATA STORAGE

(71) Applicant: Mohamad Fouad Kassan, Rochester Hills, MI (US)

(72) Inventor: Mohamad Fouad Kassan, Rochester Hills, MI (US)

( * ) Notice: Subject to any disclaimer, the term of this patent is extended or adjusted under 35 U.S.C. 154(b) by 0 days.

(21) Appl. No.: 18/587,090

(22) Filed: Feb. 26, 2024

(51) Int. Cl.
    *H04L 9/40* (2022.01)
    *H04L 41/22* (2022.01)

(52) U.S. Cl.
    CPC .......... *H04L 63/0428* (2013.01); *H04L 41/22* (2013.01)

(58) Field of Classification Search
    None
    See application file for complete search history.

(56) References Cited

U.S. PATENT DOCUMENTS

| 2014/0310513 A1* | 10/2014 | Barney | H04L 9/0841 713/153 |
| 2016/0239556 A1* | 8/2016 | Oh | H04L 67/06 |
| 2019/0356650 A1* | 11/2019 | Leavy | H04L 63/06 |

\* cited by examiner

*Primary Examiner* — Brandon Hoffman
(74) *Attorney, Agent, or Firm* — Dunlap Bennett & Ludwig, PLLC

(57) ABSTRACT

A method includes receiving, from a user device, a request to store data in a computer storage medium. The method includes generating a local encryption key for a user of the user device. The method includes providing the local encryption key to the user of the user device. The user maintains the local encryption key separate from the user device. The method includes generating a storage encryption key for encrypting the data for storage in the computer storage medium. The method includes encrypting the data with the storage encryption key to generate encrypted data. The method includes encrypting the storage encryption key with the local encryption key to generate an encrypted storage encryption key. The method includes transmitting the encrypted data and the encrypted storage encryption key to the computer storage medium. The method includes removing the storage encryption key and the encrypted storage encryption key from the user device.

10 Claims, 4 Drawing Sheets

MACHINE LEARNING AND QUANTUM COMPUTING RESISTANT SYSTEMS FOR PRIVATE AND SHARED CLOUD DATA STORAGE

FIELD

The present disclosure relates to encryption and computer security and, more particularly, to network and local storage encryption and computer security.

BACKGROUND

Remote or "cloud" storage has become a popular method for storing data and content. It allows a user to access large quantities of data and content that would normally overwhelm the local device storage of the user. Remote storage also allows a user to easily share the data with other users. Remote storage, however, raises privacy concerns because the user data is controlled and maintained by third parties.

As can be seen, there is a need for systems and methods that address privacy concerns for remote data storage.

SUMMARY

Aspects of the present disclosure are directed to methods, systems, and computer-readable media for encrypting data. In one aspect of the present disclosure, a method includes receiving, from a user device, a request to store data in a computer storage medium. The method also includes generating a local encryption key for a user of the user device. Further, the method includes providing the local encryption key to the user of the user device. The user maintains the local encryption key separate from the user device. The method includes generating a storage encryption key for encrypting the data for storage in the computer storage medium. Additionally, the method includes encrypting the data with the storage encryption key to generate encrypted data. The method includes encrypting the storage encryption key with the local encryption key to generate an encrypted storage encryption key. The method includes transmitting the encrypted data and the encrypted storage encryption key to the computer storage medium. The method also includes removing the storage encryption key and the encrypted storage encryption key from the user device.

DETAILED DESCRIPTION OF THE DISCLOSURE

The following detailed description is of the best currently contemplated modes of carrying out exemplary embodiments of the disclosure. The description is not to be taken in a limiting sense but is made merely for the purpose of illustrating the general principles of the disclosure, since the scope of the disclosure is best defined by the appended claims.

Due to the use of networked or "cloud" storage, privacy issues can arise to the accessibility of the remotely stored data. For example, artificial intelligence (AI) may access and learn from private data to recommend and/or generate public information. Cloud software systems owners implicitly have access to private data either directly, or indirectly via remote storage. Moreover, accessing data across platforms through public networks raises the possibility that intermediate computing software can capture the data. This can cause private data to be accessed, used, and presented publicly.

Systems owners can utilize known encryption and decryption methods and keys. These devices and systems, however, are not directed to the identification of potential threats coming from Machine Learning using private data and generating content publicly. As such, current systems lack the guarantee that the sole person that decrypting data is the data owner.

Figure 1:
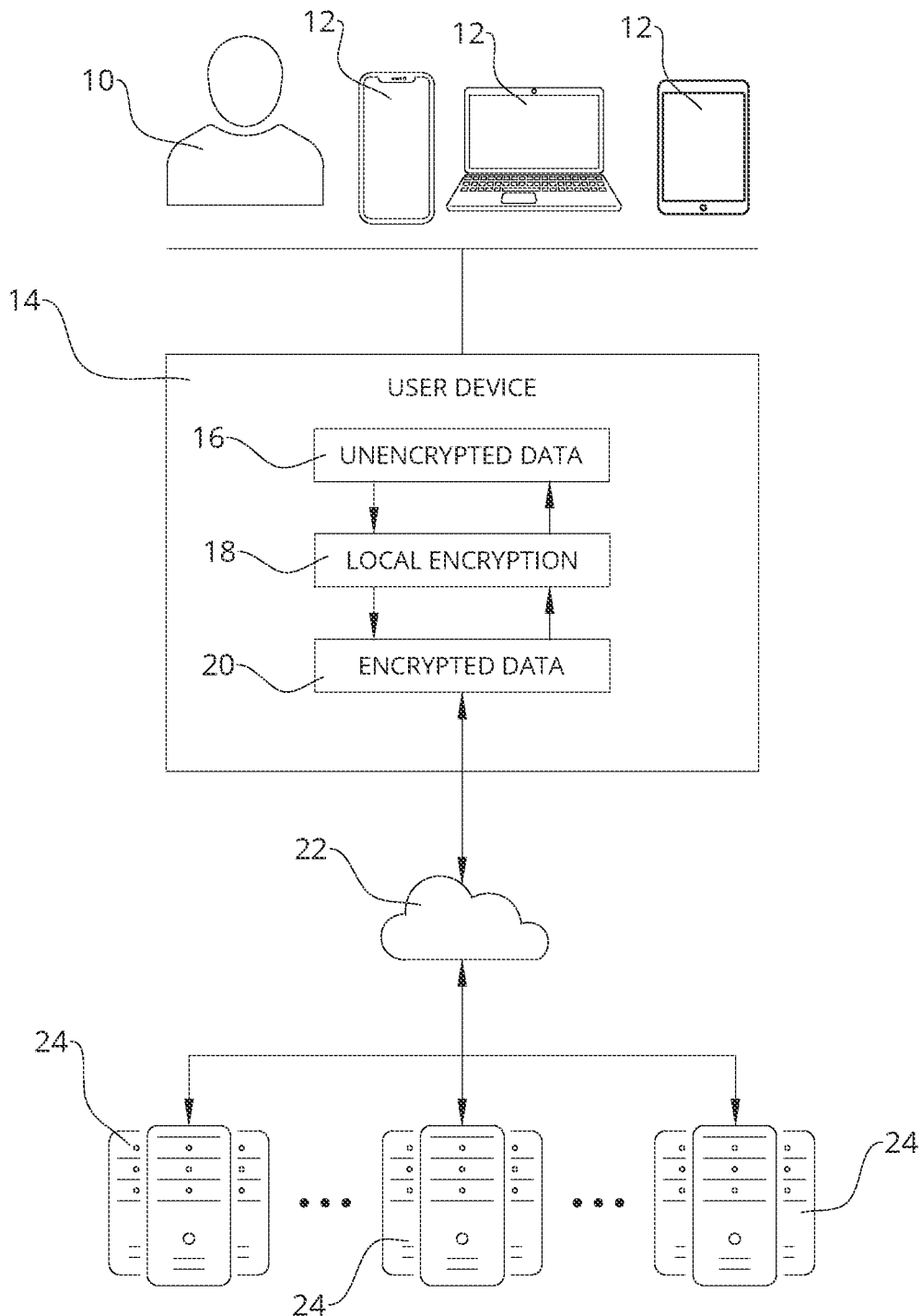
FIG. 1 is a schematic view of a network environment using local encryption, according to aspects of the present disclosure.

Referring now to FIGS. 1-4, FIG. 1 illustrates a network environment in which local encryption can be utilized to secure data, according to aspects of the present disclosure. The location encryption generates a local key that is only accessible by a user. The local key can be seamlessly used to encrypt data to be transmitted remotely and stored. While FIG. 1 illustrates various components of the network environment, additional components can be added, and existing components can be removed.

As illustrated in FIG. 1, the network environment can include a user 10 that operates one or more user devices 12. The user device 12 can include one or more electronic devices such as a laptop computer, a desktop computer, a tablet computer, a smartphone, a thin client, a smart appliance, and the like. In embodiments, the user 10 can desire to store data, for example, files (pictures, videos, pdfs, documents, music, 3D, etc.), metadata, databases, credit cards, IDs, passwords, etc. on one or more remote storage devices and/or services 24 (hereinafter remote storage 24). In embodiments, the user 10 can desire to store data, for example, files (pictures, videos, pdfs, documents, music, 3D, etc.), metadata, databases, credit cards, IDs, passwords, etc. on one or more local storage devices and/or services 24 (hereinafter local storage).

To protect the data being stored by the remote storage 24, the user device 12 can utilize an encryption process 14 that locally encrypts the data prior to transmission via one or more networks 22. The encryption process generally includes identifying content to be stored on the remote storage 24 (stage 16). Once identified, the user device 12 can perform local encryption on the content (stage 18). Once encrypted, the encrypted content can be transmitted to the remote storage 24 via the one or more networks 22 (stage 20). While the processes are described as being used with network storage, the processes can be used with local storage, network storage, and combinations thereof.

In embodiments, the user device 12 can store and execute a software application that performs the process 14 locally on the user device 12. To access the software, the user 10 can establish a username and password with the software. The software executing on the user device 12 can generate a local key for the user 10 and encrypt the content using the local key. In embodiments, the software can utilize AES 256. Encryption to encrypt the content. As such, the software can generate a symmetric local key for the user 10. The software application can visually present the local key to the user 10 for recording or storage. For example, the software application can present the local key in text forms such that the user 10 can record the key in other media. In another example, the software application can present the local key in a machine-readable form (e.g., QR code) that can be read and stored by a separate local user device.

In embodiments, the software application executing on the user device 12 can operate an interface for the remote storage 24. For example, the user 10 can then access content of the user device 12 to upload the remote storage 24. The software can implicitly encrypt any content selected for storage on the remote storage 24. To download files, the remote storage 24 can send to the user device 12, software files metadata, on which the user 10 can decide which file to download. After the download, the software application can decrypt the file automatically for the user 10 and show the content.

By using the encryption process 14, the user 10 can ensure that the data cannot be accessed, viewed, and/or utilized by any other user and/or operator of the remote storage 24. As such, the user 10 can ensure that third parties cannot process the content stored on the remote storage, whether the third party is humans or machines. For example, if the content stored includes photos, the remote storage 24 cannot decrypt the content to classify them, to learn from them, or even to recommend based on stored content. As such, the remote storage 24 can have zero knowledge what is the real decrypted content. And zero knowledge about how to decrypt it.

In embodiments, the user device 12 includes one or more processing devices coupled to a communication device. The processing device is also coupled to a memory device and an input/output ("I/O") interface. In embodiments, the communication interface enables the user device 12 to communicate with other devices and systems via the one or more networks 22, e.g., the remote storage 24. The software application for performing the encryption can be stored in the memory device. The software application can include the necessary logic, instructions, and/or programming to perform the processes and methods described in further detail below. The software application can be written in any programming language. The memory device can also include one or more databases that store information and data associated with the process and methods described below in further detail.

According to aspects of the present disclosure, the software application provides unique interfaces that allow the user 10 to select access the encryption process, generate a local encryption key, select content for encryption, etc. The software application operates to generate and provide graphical user interfaces (GUIs) to the application 122, for example, menus, widgets, text, images, fields, etc., as described below in further detail. The software application also provide one or more application programming interface (APIs) that provide connection points for one or more application.

The processing device, the communication device, the memory device, and the I/O interface can be interconnected via a system bus. The system bus can be and/or include a control bus, a data bus, and address bus, and so forth. The processing device can be and/or include a processor, a microprocessor, a computer processing unit ("CPU"), a graphics processing unit ("GPU"), a neural processing unit, a physics processing unit, a digital signal processor, an image signal processor, a synergistic processing element, a field-programmable gate array ("FPGA"), a sound chip, a multi-core processor, and so forth. As used herein, "processor," "processing component," "processing device," and/or "processing unit" can be used generically to refer to any or all of the aforementioned specific devices, elements, and/or features of the processing device.

The memory device can be and/or include computerized storage medium capable of storing electronic data temporarily, semi-permanently, or permanently. The memory device can be or include a computer processing unit register, a cache memory, a magnetic disk, an optical disk, a solid-state drive, and so forth. The memory device can be and/or include random access memory ("RAM"), read-only memory ("ROM"), static RAM, dynamic RAM, masked ROM, programmable ROM, erasable and programmable ROM, electrically erasable and programmable ROM, and so forth. As used herein, "memory," "memory component," "memory device," and/or "memory unit" can be used generically to refer to any or all of the aforementioned specific devices, elements, and/or features of the memory device.

The communication device enables the user device 12 to communicate with other devices and systems. The communication device can include, for example, a networking chip, one or more antennas, and/or one or more communication ports. The communication device can generate radio frequency (RF) signals and transmit the RF signals via one or more of the antennas. The communication device can generate electronic signals and transmit the RF signals via one or more of the communication ports. The communication device can receive the RF signals from one or more of the communication ports. The electronic signals can be transmitted to and/or from a communication hardline by the communication ports. The communication device can generate optical signals and transmit the optical signals to one or more of the communication ports. The communication device can receive the optical signals and/or can generate one or more digital signals based on the optical signals. The optical signals can be transmitted to and/or received from a communication hardline by the communication port, and/or the optical signals can be transmitted and/or received across open space by the communication device.

The communication device can include hardware and/or software for generating and communicating signals over a direct and/or indirect network communication link. As used herein, a direct link can include a link between two devices where information is communicated from one device to the other without passing through an intermediary. For example, the direct link can include a Bluetooth™ connection, a Zigbee connection, a Wifi Direct™ connection, a near-field communications ("NFC") connection, an infrared connection, a wired universal serial bus ("USB") connection, an ethernet cable connection, a fiber-optic connection, a firewire connection, a microwire connection, and so forth. In another example, the direct link can include a cable on a bus network. An indirect link can include a link between two or more devices where data can pass through an intermediary, such as a router, before being received by an intended recipient of the data. For example, the indirect link can include a WiFi connection where data is passed through a WiFi router, a cellular network connection where data is passed through a cellular network router, a wired network connection where devices are interconnected through hubs and/or routers, and so forth. The cellular network connection can be implemented according to one or more cellular network standards, including the global system for mobile communications ("GSM") standard, a code division multiple access ("CDMA") standard such as the universal mobile telecommunications standard, an orthogonal frequency division multiple access ("OFDMA") standard such as the long term evolution ("LTE") standard, and so forth.

As described above, the remote storage 24 can be hosted and/or instantiated on a "cloud" or "cloud service." As used herein, a "cloud" or "cloud service" can include a collection of computer resources that can be invoked to instantiate a virtual machine, application instance, process, data storage, or other resources for a limited or defined duration. The collection of resources supporting a cloud can include a set of computer hardware and software configured to deliver computing components needed to instantiate a virtual machine, application instance, process, data storage, or other resources. For example, one group of computer hardware and software can host and serve an operating system or components thereof to deliver to and instantiate a virtual machine. Another group of computer hardware and software can accept requests to host computing cycles or processor time, to supply a defined level of processing power for a virtual machine. A further group of computer hardware and software can host and serve applications to load on an instantiation of a virtual machine, such as an email client, a browser application, a messaging application, or other applications or software. Other types of computer hardware and software are possible.

In embodiments, the components and functionality of the remote storage 24 can be and/or include a "server" device. The term server can refer to functionality of a device and/or an application operating on a device. The server device can include a physical server, a virtual server, and/or cloud server. For example, the server device can include one or more bare-metal servers such as single-tenant servers or multiple-tenant servers. In another example, the server device can include a bare metal server partitioned into two or more virtual servers. The virtual servers can include separate operating systems and/or applications from each other.

In yet another example, the server device can include a virtual server distributed on a cluster of networked physical servers. The virtual servers can include an operating system and/or one or more applications installed on the virtual server and distributed across the cluster of networked physical servers. In yet another example, the server device can include more than one virtual server distributed across a cluster of networked physical servers.

Various aspects of the systems described herein can be referred to as "information," "content," and/or "data." Content and/or data can be used to refer generically to modes of storing and/or conveying information. Accordingly, data can refer to textual entries in a table of a database. Content and/or data can refer to alphanumeric characters stored in a database. Content and/or data can refer to machine-readable code. Content and/or data can refer to images. Content and/or data can refer to audio and/or video. Content and/or data can refer to, more broadly, a sequence of one or more symbols. The symbols can be binary. Content and/or data can refer to a machine state that is computer-readable. Content and/or data can refer to human-readable text.

The user device 12 can provide I/O devices for outputting information in a format perceptible by a user and receiving input from the user. For example, the user device 12 can communicate with the I/O devices via the I/O interface. The I/O devices can display graphical user interfaces ("GUIs") generated by the software application. The I/O devices can include a display screen such as a light-emitting diode ("LED") display, an organic LED ("OLED") display, an active-matrix OLED ("AMOLED") display, a liquid crystal display ("LCD"), a thin-film transistor ("TFT") LCD, a plasma display, a quantum dot ("QLED") display, and so forth. The I/O devices can include an acoustic element such as a speaker, a microphone, and so forth. The I/O devices can include a button, a switch, a keyboard, a touch-sensitive surface, a touchscreen, a camera, a fingerprint scanner, and so forth. The touchscreen can include a resistive touchscreen, a capacitive touchscreen, and so forth.

Figure 2:
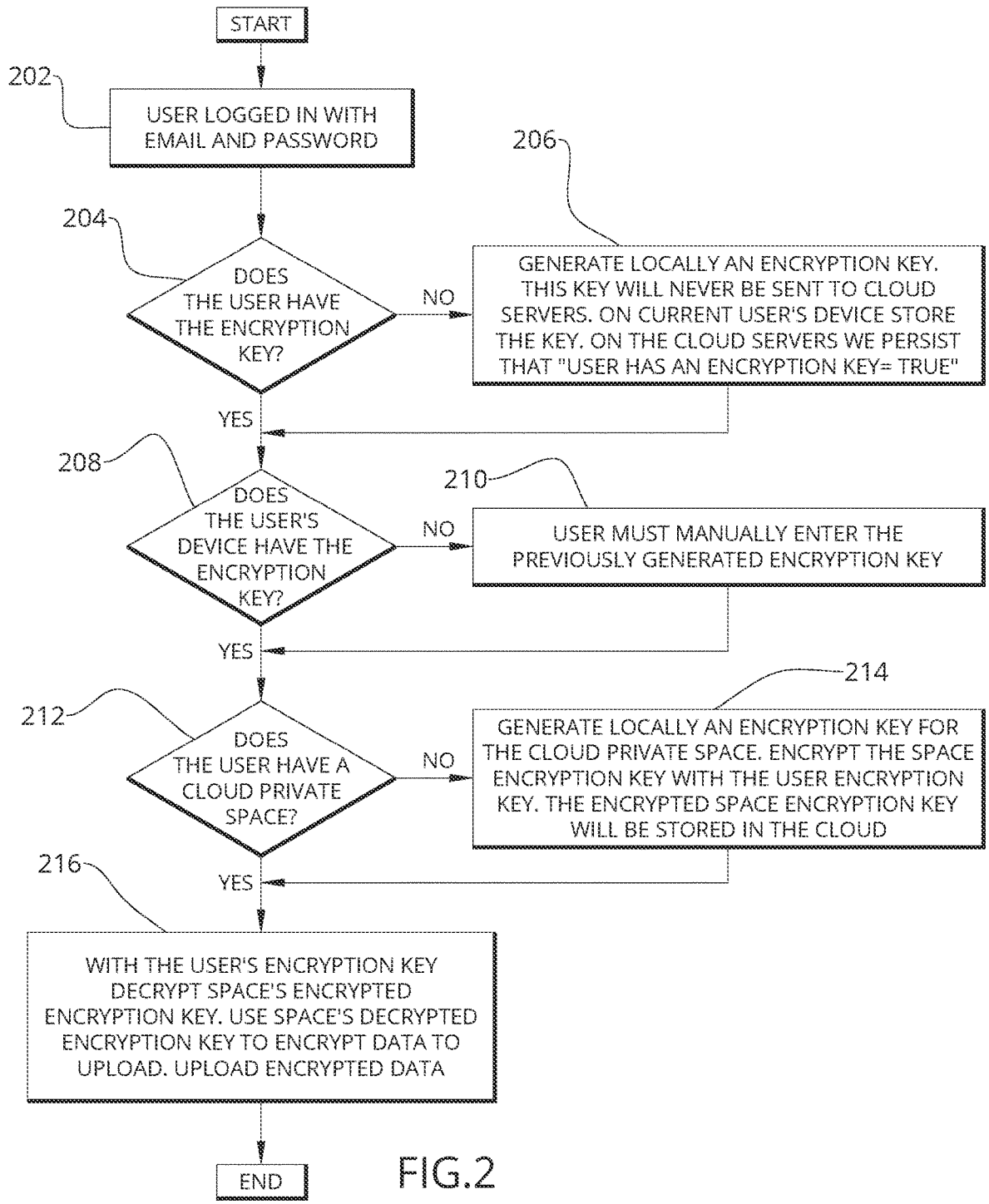
FIG. 2 is a flow diagram of a method for local encryption, according to aspects of the present disclosure.

FIG. 2 illustrates a method for local and/or remote encryption, according to aspects of the present disclosure. While FIG. 2 illustrates various stages of the method for local and/or remote encryption, additional stages can be added, and existing stages can be removed and/or reordered. Additionally, while the method below is described for remote storage, e.g., cloud storage, the same process stages can be performed for local storage.

In stage 202, a user can log in to the software. For example, the user 10 can login to the user device 12 using an email and a password. In stage 204, it can be determined if the user has an encryption key.

If the user does not have an encryption key, in stage 206, an encryption key is generated locally. The local key is held privately by the user and not shared with other devices or people. The local key may never be sent to the remote storage 24, for example, cloud storage. The local key can be maintained on the user device 12 or other type of media. For example, the user can maintain the local key in a separate storage medium. Likewise, for example, the user can maintain the local key on a non-electronic, physical medium, e.g., paper. On the remote storage 24, the software application can persist that the user has an encryption key.

Figure 4A:
FIGS. 4A and 4B illustrate graphical user interface, according to aspects of the present disclosure.
Figure 4B:
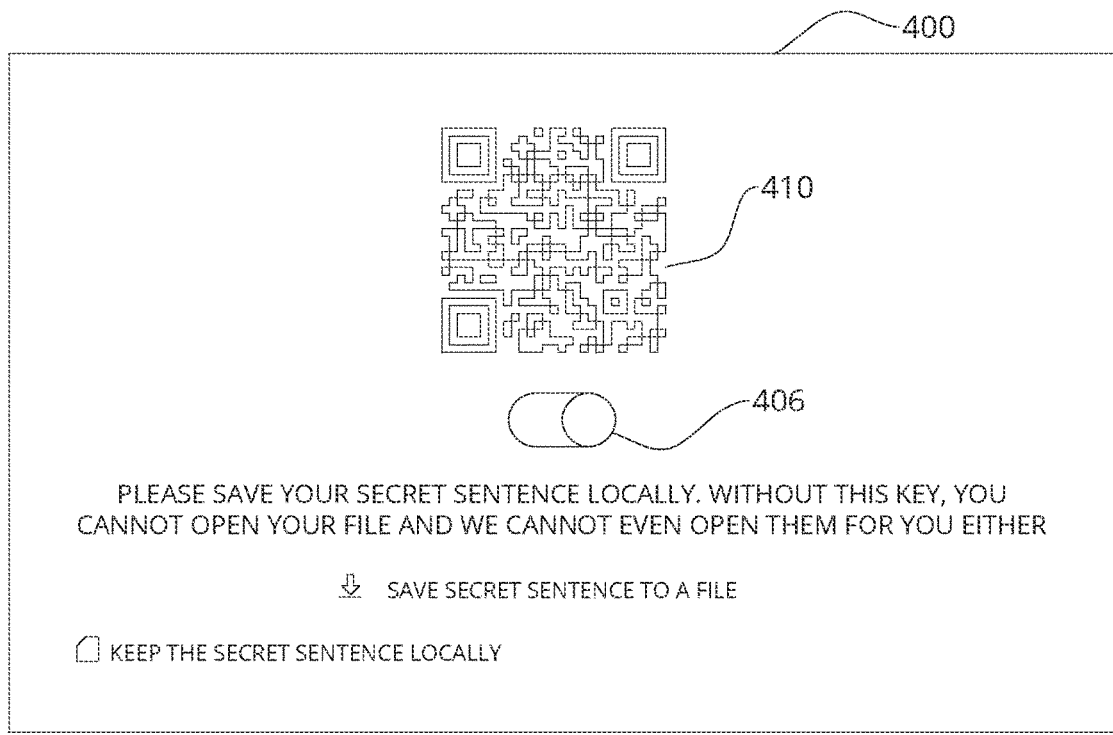

FIGS. 4A and 4B illustrate examples of a GUI 400 for displaying a locally generated key to the user. As illustrated in FIG. 4A, a text version 402 of the local key can be displayed to the user 10. The GUI 400 can include one or more widgets 404 that allow the user 10 to save the key to a file or copy the key to a clipboard. The GUI 400 can also include a widget 406 that causes the local key to be converted to a machine-readable representation 410, as illustrated in FIG. 4B.

If the user has an encryption key, in stage 210, the encryption key can be entered by the user. For example, the user 10 can manually enter the local key in a GUI using the I/O devices of the user device 12. In another example, the user 10 can retrieve the local key from a file or other media for entry.

In stage 212, it can be determined if the user has a private remote storage space. If the user does not have a remote storage space, in stage 214, a storage encryption key for the remote storage space can be generated locally. The storage encryption key can be encrypted using the local key of the user. The encrypted storage encryption key can then be transmitted and stored in the remote storage 24. The storage encryption key is then removed and/or deleted from the user's computer device. As such, the owner of the remote storage only has access to the strange encryption key in an encrypted form. Moreover, because the storage encryption key is removed from the user's computer device, the storage encryption key is prevented from being stolen and/or leaked from the user's computer device.

In stage 216, if the user has a remote storage space (e.g., previously generated), the storage encryption key, which is encrypted, can be retrieved form the remote storage space and can be decrypted using the local key. The storage encryption key can then be utilized to encrypt data to be stored in the remote storage 24 and/or decrypt data that is stored in the remote storage 24. Once the data is encrypted and/or decrypted, the storage encryption key is then removed and/or deleted from the user's computer device. As such, data can be stored on the remote storage 24, which is not accessible by the owner of the remote storage 24.

Figure 3:
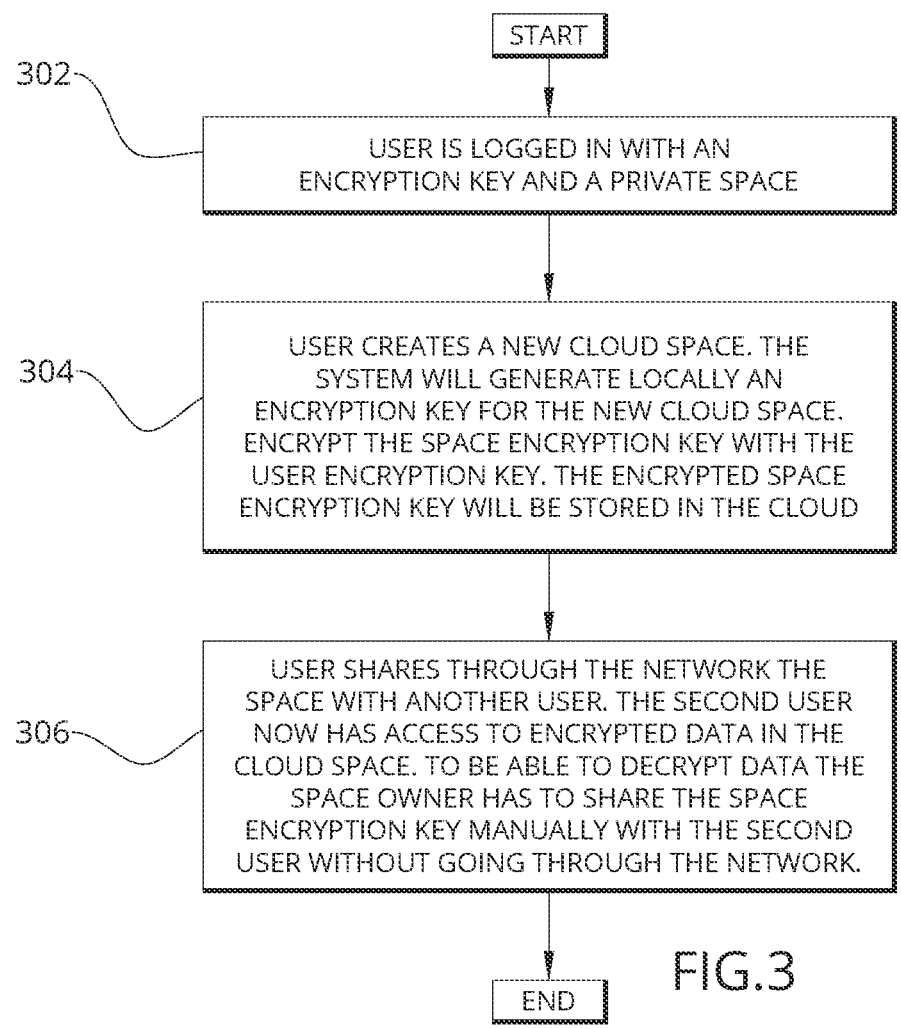
FIG. 3 is a flow diagram of adding an additional user, according to aspects of the present disclosure.

FIG. 3 illustrates a method for sharing remote storage, according to aspects of the present disclosure. While FIG. 3 illustrates various stages of the method for local encryption, additional stages can be added, and existing stages can be removed and/or reordered.

In stage 302, the user can login. For example, the user can log in to the remote storage 24. In stage 304, the user can create a remote storage space. A storage encryption key for the remote storage space can be generated locally, as described above. The storage encryption key can be encrypted using the local key of the user, as described above. The encrypted storage encryption key can then be transmitted and stored in the remote storage 24.

In stage 306, the user can share access to the remote storage space with a second user. To access the content in the remote storage space, the user 10 can share the storage encryption key with the second user. For example, user 10 can share the storage encryption key manually through one or more non-electronic media. Once the second user receives the storage encryption key, the storage encryption key can be encrypted using the local key of the second user, as described above. The encrypted storage encryption key can then be transmitted and stored in the remote storage 24. Accordingly, the user and the second user can have access to the remote storage space without disclosing the storage encryption key to the owner of the remote storage 24.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise. While the above is a complete description of specific examples of the disclosure, additional examples are also possible. Thus, the above description should not be taken as limiting the scope of the disclosure which is defined by the appended claims along with their full scope of equivalents.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements. As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

It should be understood, of course, that the foregoing relates to exemplary embodiments of the disclosure and that modifications can be made without departing from the spirit and scope of the disclosure as set forth in the following claims.

What is claimed is:

1. A method for data privacy, the method comprising:
   receiving, from a user device, a request to store data in a computer storage medium;
   generating a local encryption key for a user of the user device;
   providing the local encryption key to the user of the user device, wherein the user maintains the local encryption key separate from the user device and does not share the local encryption key with other computer devices not controlled by the user;
   generating a storage encryption key for encrypting the data for storage in the computer storage medium;
   encrypting the data with the storage encryption key to generate encrypted data;
   encrypting the storage encryption key with the local encryption key to generate an encrypted storage encryption key;
   transmitting the encrypted data and the encrypted storage encryption key to the computer storage medium; and
   removing the storage encryption key and the encrypted storage encryption key from the user device.

2. The method of claim 1, the method further comprising:
   downloading metadata for the data stored in the computer storage medium;
   retrieving a portion of the data stored in the computer storage medium;
   retrieving the encrypted storage encryption key from the computer storage medium;
   decrypting, using the local encryption key, the encrypted storage encryption key to generate the storage encryption key; and
   decrypting the portion of the data using the storage encryption key.

3. The method of claim 1, wherein providing the local encryption key comprises:
   generating a graphical user interface including a text representation of the local encryption key; and
   providing the graphical user interface for display on a user device.

4. The method of claim 3, wherein the graphical user interface includes a field to cause the text representation of the local encryption key to be stored in a file.

5. The method of claim 3, wherein the graphical user interface includes a field to cause the text representation of the local encryption key to be transmitted to a software application.

6. The method of claim 1, wherein providing the local encryption key comprises:
   generating a graphical user interface including a machine-readable representation of the local encryption key; and providing the graphical user interface for display on a user device.

7. The method of claim 1, wherein the computer storage medium is network storage coupled to the user device by one or more networks.

8. The method of claim 1, the method further comprising:
providing the storage encryption key to a second user device of a second user;
encrypting the storage encryption key with a second local encryption key of the second user to generate a second encrypted storage encryption key;
transmitting the second encrypted storage encryption key to the computer storage medium; and
removing the storage encryption key and the second encrypted storage encryption key from the second user device.

9. The method of claim 8, the method further comprising:
encrypting second data with the storage encryption key to generate second encrypted data; and
transmitting the second encrypted data to the computer storage medium.

10. The method of claim 8, the method further comprising:
retrieving, by the second user device, a portion of the encrypted data stored in the computer storage medium;
retrieving the second encrypted storage encryption key from the computer storage medium;
decrypting, using the second local encryption key, the second encrypted storage encryption key to generate the storage encryption key; and
decrypting the portion of the data using the storage encryption key.

\* \* \* \* \*